United States Patent
Yang et al.

(10) Patent No.: US 10,055,000 B2
(45) Date of Patent: Aug. 21, 2018

(54) METHOD AND APPARATUS FOR CONTROLLING HARD DRIVE POWER CONSUMPTION AND CONTROLLING A MANAGEMENT SERVICE OF HARD DRIVE POWER CONSUMPTION

(71) Applicant: Alibaba Group Holding Limited, Grand Cayman (KY)

(72) Inventors: Chunxin Yang, Hangzhou (CN); Xiongwei Jiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 100 days.

(21) Appl. No.: 14/938,481

(22) Filed: Nov. 11, 2015

(65) Prior Publication Data
US 2016/0132095 A1 May 12, 2016

(30) Foreign Application Priority Data
Nov. 12, 2014 (CN) .......................... 2014 1 0635703

(51) Int. Cl.
*G06F 1/32* (2006.01)
*G06F 11/07* (2006.01)
*G06F 11/00* (2006.01)
*G06F 3/00* (2006.01)
*G06F 3/06* (2006.01)

(52) U.S. Cl.
CPC .............. *G06F 1/3268* (2013.01); *G06F 3/06* (2013.01); *G06F 11/00* (2013.01); *G06F 11/0727* (2013.01); *G06F 11/0793* (2013.01); *Y02D 10/154* (2018.01)

(58) Field of Classification Search
CPC .... G06F 1/3286; G06F 11/00; G06F 11/0727; G06F 11/0793; G06F 3/06
See application file for complete search history.

(56) References Cited

U.S. PATENT DOCUMENTS

| | | |
|---|---|---|
| 5,345,347 A | 9/1994 | Hopkins et al. |
| 5,548,763 A | 8/1996 | Combs et al. |
| 5,551,043 A | 8/1996 | Crump et al. |
| 5,630,142 A | 5/1997 | Crump et al. |
| 5,682,273 A | 10/1997 | Hetzler |
| 5,742,844 A | 4/1998 | Feldman |
| 5,819,100 A | 10/1998 | Pearce |
| 5,898,880 A * | 4/1999 | Ryu ..................... G06F 1/3203 713/323 |
| 6,081,752 A | 6/2000 | Benson, IV et al. |
| 6,101,593 A | 8/2000 | Feldman |
| 6,262,545 B1 | 7/2001 | Yamamoto |
| 6,608,707 B1 | 8/2003 | Han |

(Continued)

FOREIGN PATENT DOCUMENTS

CN        103268147        8/2013

*Primary Examiner* — Stefan Stoynov (57) ABSTRACT

A method and apparatus for controlling hard drive power consumption and controlling a hard drive power consumption management service are provided. The method includes detecting whether a fault exists in a hard drive in a node hard drive group. The method further includes, if there is no fault detected in the hard drive in the node hard drive group, controlling the hard drive in the node hard drive group to convert the hard drive between preset modes of power consumption by a hard drive power consumption management service.

25 Claims, 5 Drawing Sheets

DETECTING WHETHER A FAULT EXISTS IN A HARD DRIVE IN A NODE HARD DRIVE GROUP — S101

IF THERE IS NO FAULT DETECTED IN THE HARD DRIVE IN THE NODE HARD DRIVE GROUP, CONTROLLING THE HARD DRIVE IN THE NODE HARD DRIVE GROUP TO CONVERT THE HARD DRIVE BETWEEN PRESET MODES OF POWER CONSUMPTION USING A HARD DRIVE POWER CONSUMPTION MANAGEMENT SERVICE — S102

(56) References Cited

U.S. PATENT DOCUMENTS

| | | | |
|---|---|---|---|
| 6,624,962 | B1 | 9/2003 | Kodama et al. |
| 6,650,498 | B1 | 11/2003 | Albrecht et al. |
| 6,694,200 | B1 | 2/2004 | Naim |
| 6,711,666 | B1 | 3/2004 | Feldman |
| 6,715,091 | B1 | 3/2004 | Kundu |
| 6,930,806 | B2 | 8/2005 | Han et al. |
| 7,000,109 | B2 | 2/2006 | Girard |
| 7,199,909 | B2 | 4/2007 | Han et al. |
| 7,383,382 | B2 | 6/2008 | Powell et al. |
| 7,451,332 | B2 | 11/2008 | Culbert et al. |
| 7,468,682 | B2 | 12/2008 | Altare |
| 7,548,356 | B2 | 6/2009 | Han et al. |
| 7,610,445 | B1 | 10/2009 | Manus et al. |
| 7,814,361 | B2 * | 10/2010 | Higham .............. G06F 11/1441 711/112 |
| 8,185,759 | B1 | 5/2012 | Li et al. |
| 8,237,386 | B2 | 8/2012 | Culbert et al. |
| 8,433,931 | B2 | 4/2013 | Burg et al. |
| 8,448,000 | B2 | 5/2013 | Culbert et al. |
| 8,897,622 | B2 | 11/2014 | Kirsche |
| 8,982,488 | B2 | 3/2015 | Kardach et al. |
| 9,043,627 | B2 | 5/2015 | Culbert et al. |
| 9,261,933 | B2 | 2/2016 | Burg et al. |
| 2009/0177837 | A1 * | 7/2009 | Kaneda ................. G06F 1/3203 711/112 |
| 2009/0248756 | A1 * | 10/2009 | Akidau ................. G06F 11/004 |
| 2011/0197079 | A1 * | 8/2011 | Ejiri ....................... G06F 1/266 713/300 |
| 2012/0265959 | A1 | 10/2012 | Le et al. |

\* cited by examiner

METHOD AND APPARATUS FOR CONTROLLING HARD DRIVE POWER CONSUMPTION AND CONTROLLING A MANAGEMENT SERVICE OF HARD DRIVE POWER CONSUMPTION

CROSS REFERENCE TO RELATED APPLICATION

This application claims priority to and the benefit of Chinese Patent Application No. 201410635703.1, filed on Nov. 12, 2014, which is incorporated herein by reference in its entirety.

TECHNICAL FIELD

The disclosure relates generally to the field of computer, and more particularly, to method and apparatus for controlling hard drive power consumption and controlling a management service of hard drive power consumption.

BACKGROUND

Under the scenarios of storing and applying data which is not frequently accessed (known as cold data), the accessing mode to a hard drive is mainly in the form of writing to the hard drive, the hard drive after being written to, is generally not accessed or read again. After the hard drive is full, it operates in an "idle mode" during which it consumes considerable power.

During such idle mode, a method of controlling the hard drive power consumption is usually performed by changing the power consumption mode of the hard drives of the node hard drive group from a high power consumption state to a low power consumption state through a programming of commands of reading and writing on the disk. However, this method of controlling the hard drive power consumption does not address power consumption states of changing the mode of the hard drive to perform the conversion between the high power consumption state and the low power consumption state.

Generally, when controlling hard drive power consumption, the conversion states of controlling power consumption of hard drive include four modes of controlling, which are described next.

An active mode: a hard drive is under a full speed working state, a disk of the hard drive is running at a high speed and a response time to a user request is the shortest in this mode.

An idle mode: a disk of a hard drive maintains in operating state, a head arm in the hard drive stops running, most other electronic components are under inactivate state, and power consumption is lower in this mode than in an active mode.

A standby mode: a hard drive stops running, the hard drive is under low power consumption state.

A sleep mode: a hard drive is under inactive state and power consumption is the lowest in this mode compared to other modes.

When converting a hard drive from a low power consumption state to high power consumption state, the lower the power consumption is of the hard drive, the higher the power loss is and the longer the time it takes to transition between states which additionally results in delays during this transition. Even though power loss is occurring, it is not always possible to perform conversion directly between the low power consumption state and the high power consumption state to immediately reduce the power loss occurring.

The reason is because a hard drive needs to transit through certain modes such as a standby mode when changing from a sleep mode to an active mode. The transition of modes causes time delay, as well as can result in high power loss.

Therefore, a conventional method of controlling hard drive power consumption has drawbacks of a time delay during conversion because of necessary transitions, resulting in wasted resources.

SUMMARY OF THE DISCLOSURE

It would be advantageous to provide a method and an apparatus for controlling hard drive power consumption to save time and power.

Embodiments of the disclosure provide methods and apparatus for controlling hard drive power consumption and controlling a hard drive power consumption management service. The disclosure addresses the issues of the conventional implementations by providing desirable techniques to address the shortcomings of power losses during converting modes of hard drives and the controlling of power consumption of hard drive during operation.

Accordingly, an embodiment according to the disclosure provides a process to control hard drive power consumption. The process includes detecting if a fault exists in a hard drive in a node hard drive group. If there is no fault in any hard drive in the node hard drive group, the process further includes controlling the hard drive in the node hard drive group to convert the hard drive between preset modes of power consumption by a hard drive power consumption management service.

Accordingly, an embodiment according to the disclosure provides a process to control a hard drive power consumption management service. The process includes detecting an operating environment of a hard drive power consumption management service. Further, the process includes, if, the operating environment of the hard drive power consumption management service meets preconditions, controlling a start/stop operation the hard drive power consumption management service.

Accordingly, an embodiment according to the disclosure provides a mechanism to control hard drive power consumption. There is a hard drive detector configured for detecting fault in a hard drive of a node hard drive group. A power consumption controller module actuates, if there is no fault in the hard drive in the node hard drive group, the hard drive of the node hard drive group to convert between preset modes of power consumption.

Accordingly, an embodiment according to the disclosure provides another mechanism to control a hard drive power consumption management service. The mechanism includes an environment detector for detecting an operating environment of a hard drive power consumption management service. Further, the mechanism includes a process controller to control a start/stop operation of the hard drive power consumption management service in accordance with parameters sent from an operating system if the operating environment of the hard drive power consumption management service meets preconditions.

Accordingly, an embodiment according to the disclosure provides a system to control hard drive power consumption. The system includes instructions to detect if there is a fault in a hard drive in a node hard drive group. The system further includes instructions to control the hard drive in the node hard drive group to convert between preset modes of power consumption through a hard drive power consumption management service if there is no fault in the hard drive in the node hard drive group.

Accordingly, an embodiment according to the disclosure provides a system to control a management service of hard drive power consumption. The system includes instructions to detect an operating environment of a hard drive power consumption management service. The system further includes instructions to control a start/stop operation of the hard drive power consumption management service if the operating environment of the hard drive power consumption management service meets preconditions.

This summary includes, by necessity, simplifications, generalizations and omissions of detail. Consequently, those skilled in the art will appreciate that the summary is illustrative only and is not intended to be in any way limiting. Other aspects, inventive features, and advantages of the disclosure, as defined solely by the claims, will become apparent in the non-limiting detailed description set forth below.

BRIEF DESCRIPTION OF THE DRAWINGS

Embodiments of the disclosure will be better understood from a reading of the following detailed description, taken in conjunction with the accompanying drawings in which like reference characters designate like elements.

DETAILED DESCRIPTION

Reference will now be made in detail to embodiments, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of embodiments, numerous specific details are set forth in order to provide a thorough understanding of the disclosure. However, it will be recognized by one of ordinary skill in the art that embodiments may be practiced without these specific details. In other examples, well-known methods, procedures, and components have not been described in detail so as not to unnecessarily obscure aspects of embodiments.

In an embodiment according to the disclosure, terminal devices, service network devices and trusted parties each include one or more central processing units (CPU), input/output interfaces, network interfaces, and memories.

The memories may include multiple types of computer-readable mediums, such as, a volatile memory, a random access memory (RAM), and/or a non-volatile memory. For example, a non-volatile memory may be a read only memory (ROM) or a flash random access memory (flash RAM). A memory is one example of a computer-readable medium.

A computer-readable medium includes permanent, non-permanent, removable, and/or non-removable types. Information storage can be achieved by any means or technique. The information can be computer readable instructions, data structures, program sub-units or other type of data. Examples of a computer readable medium include, but not limit to, phase-change RAM (PRAM), static random access memory (SRAM), dynamic random access memory (DRAM), other type of RAMs, read only memory (ROM), electrically erasable programmable read only memory (EEPROM), flash memory, other memory technologies, CD-ROM, DVD, other optical mediums, magnetic tape cassette, magnetic drive storage or other magnetic storages, or any other non-transitory mediums that can be used as a storage and can be accessed by computing devices. According to disclosure, the computer-readable medium do not include a transitory medium, such as a modulated data signal and a carrier wave.

Figure 1:
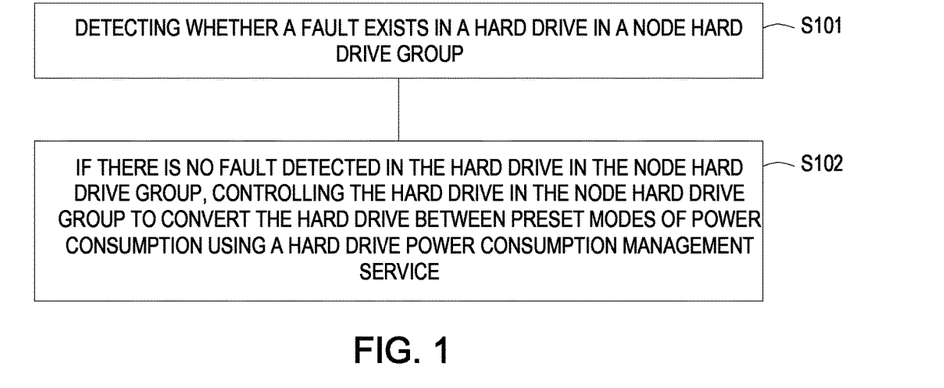
FIG. 1 is a flow diagram of a method of controlling power consumption of hard drive in accordance with an embodiment.

FIG. 1 shows a process for controlling hard drive power consumption. In step S101, it is detected whether there is a fault in a hard drive in a node hard drive group. The node hard drive group includes at least two hard drives.

When no fault is detected in any hard drive in the node hard drive group, in step S102, a hard drive power consumption management service is actuated to make the hard drives convert between the preset power consumption states.

The pre-configured power consumption states include one high power consumption state and one low power consumption state. A high power consumption state may be the power consumption state when the hard drive is under active mode. A low power consumption state may be the power consumption state when the hard drive is under standby mode.

Figure 2:
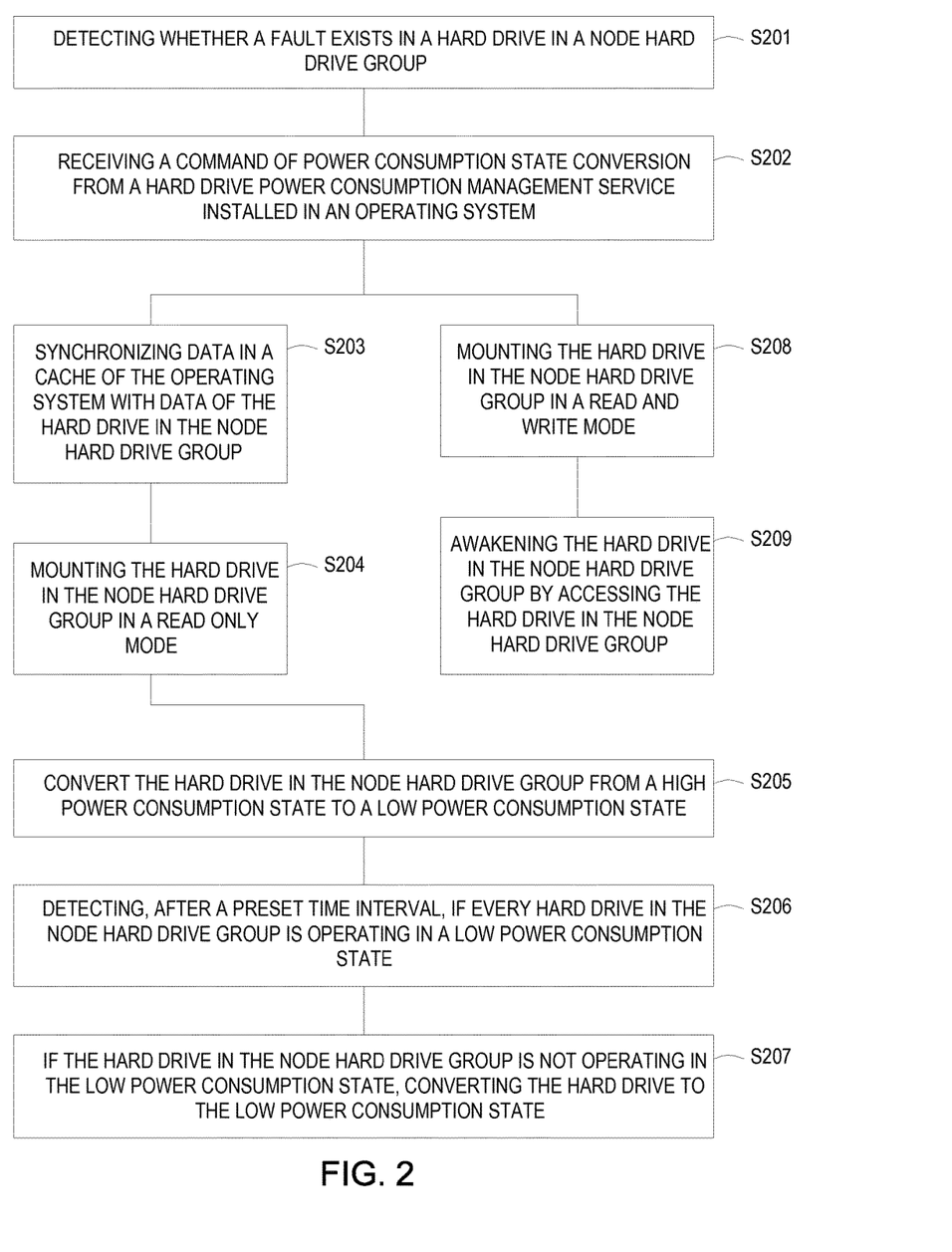
FIG. 2 is a flow diagram of another method of controlling power consumption of hard drive in accordance with an embodiment.

FIG. 2 shows another embodiment of the disclosure describing a process of controlling hard drive power consumption. At step S201, detection takes place for a fault in a hard drive in a node hard drive group. If there is any fault detected in the hard drives of the node hard drive group or a hard drive of the node hard drive group has not been mounted, it may not be possible to control the hard drive in the node hard drive group of converting between the preset states through a hard drive power consumption management service provided by an operating system. Therefore, in order to ensure the reliable operation of the hard drive power consumption management service, it is first detected whether there is any fault in the hard drives of a node hard drive group.

If there is no fault detected in the hard drive of the node hard drive group, step S202 is executed. However, if there is any fault in the hard drive in the node hard drive group or a hard drive of the node hard drive group has not been mounted, an error warning message can be prompted for necessary countermeasures to overcome the detected faults.

In step S202, a command is received to convert a power consumption state in the hard drive in the node hard drive group. The command to convert the power consumption state is sent by the hard drive power consumption management service, which is installed in the operating system.

In an embodiment according to the disclosure, a hard drive in a node hard drive group can be controlled by the hard drive power consumption management service through a hard drive programming interface, which can prevent conflicts with the operation of the hard drive programming when sending a command to the hard drive directly through an Input/output (I/O) port. This hard drive programming interface is configured to convert a hard drive between preset high power consumption states to a preset low power consumption state or vice versa.

In an embodiment according to the disclosure, the high power consumption state is the power consumption state when the hard drive in the node hard drive group is under an active mode. The low power consumption state is the power consumption state when the hard drive in the node hard drive group is under a standby mode.

When the command is received to convert the hard drive in the node hard drive group from a high power consumption state to a low power consumption state, steps S203 to S207 are executed. Alternately, when the command is received to convert the hard drive in the node hard drive group from a low power consumption state to a high power consumption state, steps S208 to S209 are executed.

In step S203, data of a cache of the operating system is synchronized to the hard drive in the node hard drive group.

In an embodiment according to the disclosure, when the command sent by the hard drive power consumption management service to convert the hard drive in the node hard drive group from a high power consumption state to a low power consumption state is received, in order to avoid data loss, the data in the cache of the operating system is synchronized to the hard drive in the node hard drive group. Thereafter, the hard drive is converted to sleep mode for a short period (e.g., 10 seconds) for the completion of the data synchronization.

In step S204, the hard drive in the node hard drive group is mounted in read-only mode.

In an embodiment according to the disclosure, in order to avoid the operation of both read and write operations to the hard drive in the node hard drive group, the hard dive in the node hard drive group can be mounted in read-only mode.

In step S205, the hard drive in the node hard drive group is converted from a high power consumption state to a low power consumption state, when the hard drive in the node hard drive group is mounted in read-only mode.

In an embodiment according to the disclosure, the hard drive power consumption management service can send a set of commands of converting a hard drive of a node hard drive group from a high power consumption state to a low power consumption state in parallel, which saves time for converting multiple hard drives in the node hard drive group from high power consumption states to low power consumption states.

If there is a failure in the conversion operation, such as converting a hard drive in a node hard drive group from a high power consumption state to a low power consumption state, the hard drive may be placed in a sleep mode for 2 seconds. Thereafter, the conversion operation will be retried again. If the conversion operation fails again, a notification of this failure can be issued, e.g., releasing warning information of the fault that the conversion of hard drive power consumption has failed to convert states.

In order to finish the conversion of a hard drive in a node hard drive group from a high power consumption state to a low power consumption state, embodiments according to the disclosure includes the further steps of setting preset time intervals as below.

In step S206, the hard drive in the node hard drive group is detected periodically according to a preset time interval to determine if it is under a low power consumption state.

By traversing the hard drives in the node hard drive group periodically according to a preset time interval, it can be determined whether the hard drives are under a low power consumption state. The lengths of preset time intervals can be set according to operational needs. For example, preset time intervals can be set as 10 seconds, 50 seconds, or 2 hours, etc.

In step S207, when a hard drive in the node hard drive group is not under a low power consumption state, the hard drive is converted to a low power consumption state.

In an embodiment according to the disclosure, when a hard drive in the node hard drive group is detected to be operating in state that is not a low power consumption state, in order to keep the hard drive in the node hard drive group in low power consumption state, the hard drive power consumption management service can convert the hard drive which is not operating in a low power consumption state to a low power consumption state by a hard drive programming interface.

When the conversion operation of a hard drive from a high power consumption state to a low power consumption state fails, the hard drive power consumption management service can issue notification of the failure by releasing warning information of a fault indicating a failure of the conversion.

When the command is received to convert the hard drive in the node hard drive group from a low power consumption state to a high power consumption state, steps S208 to S209 are executed.

In step S208, a hard drive in the node hard drive group is mounted in read-and-write mode.

In an embodiment according to the disclosure, hard drives in the node hard drive group can be mounted in read-and-write mode in parallel to control the conversion of the hard drives in the node hard drive group when transitioning from a low power consumption states to a high power consumption states, which can decrease the time used for awakening hard drives.

When the conversion of a hard drive from a low power consumption state to a high power consumption state fails, the hard drive power consumption management service can issue warning information of a fault during the conversion process.

In step S209, the hard drive in the node hard drive group is accessed to awake the hard drives in the node hard drive group.

In an embodiment according to the disclosure, access operation may be performed to the hard drive to ensure the success of the conversion of a hard drive from a low power consumption state to a high power consumption state; and the hard drive may be accessed in a number of ways. For example, one way of accessing the hard drives is by creating an empty hidden file under a mount directory of the hard drive in the node hard drive group. After the successful creation of the hidden file, the hidden file is deleted from the mount directory.

Figure 3A:
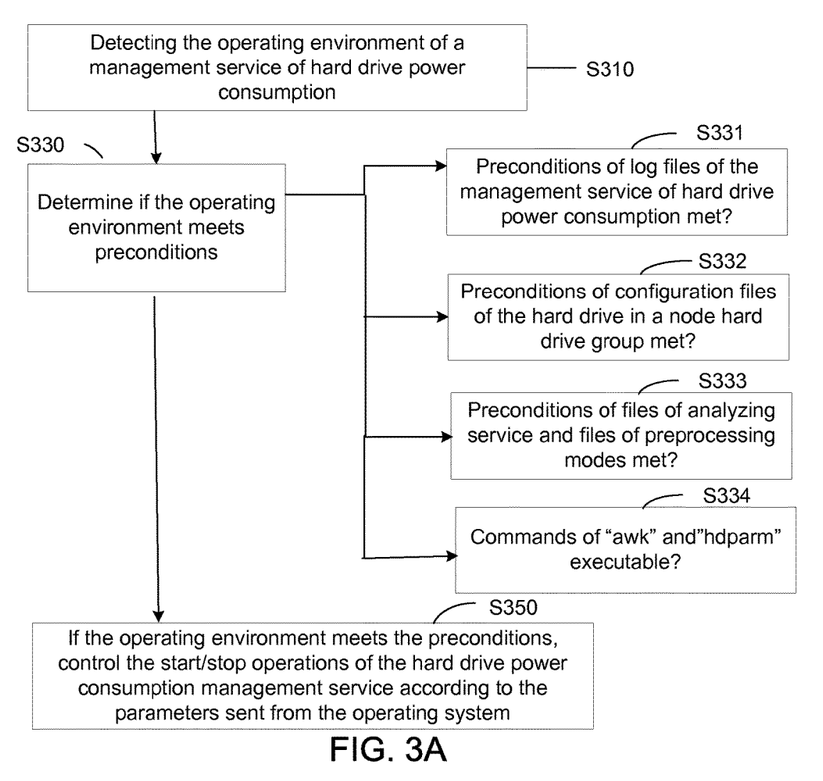
FIG. 3A is a flow diagram of a method of controlling a hard drive power consumption management service in accordance with an embodiment.

FIG. 3A shows an embodiment according to the disclosure which illustrates a process of controlling by a hard drive power consumption management service.

In step S310, the operating environment of a hard drive power consumption management service is detected.

In an embodiment according to the disclosure, by detecting the operating environment of the hard drive power consumption management service, it can be determined in step S330 whether the operating environment meets a preset condition.

In an embodiment according to the disclosure, the preset condition or precondition determined in step S330 may include the following: the existence of log files of the hard drive power consumption management service, the existence of configuration files of the hard drive in the node hard dive group, and the existence of files of analyzing service and files of preprocessing modes. Preconditions may also include that the configuration files of the hard drives in the node hard dive group are found not to be empty, and the files of the analyzing service and the files of preprocessing modes have execution permissions.

In an embodiment according to the disclosure, to implement the above preconditions, the method includes the following:

First, in step S331, it is detected if there are available log files of the hard drive power consumption management service. If there is no such log file, an empty log file is created.

After checking the availability of the log files, then the method proceeds step S332 to detect if the configuration files of the hard drive are available. If there are no configuration files of the hard drive, warning information that no configuration files of the hard drive can be returned. If there is a configuration file of the hard drive, it is determined if a configuration file of the hard drive in the node hard dive group is empty. If the configuration file of the hard drive in the node hard dive group is empty, warning information that the configuration file of the hard drive in the node hard dive group is empty is returned.

Then, in step S333 it is detected if files of analyzing service or files of preprocessing associated with modes are available. If there are no such files, warning information that no files of analyzing service or files for preprocessing is returned. If there are such files, then it is determined whether the files of analyzing service or files of preprocessing associated to modes have execution permissions. If the files of analyzing service and files of preprocessing associated to modes do not have execution permissions, warning information of non-executable files of the analyzing services and non-executable files of preprocessing associated to modes is returned.

Finally, in step S334, it is determined if commands of "awk" and "hdparm" may be executed under current operating environment. If the commands are not executable, warning information that these commands do not exist is returned. The "awk" command applies to text processing, and analyzing outputs of other commands, while the "hdparm" command applies to querying and setting hard drive parameters.

In step S350, when an operating environment of the hard drive power consumption management service meets a set of preconditions, the on/off (or start/stop) operation of the hard drive power consumption management service is controlled according to the parameters sent by the operating system. In some embodiments, the start operation and the stop operation are executed separately.

In an embodiment according to the disclosure, the hard drive power consumption management service is initiated when a first parameter of the operating system, e.g. a "starting parameter" is received. When receiving a second parameter (such as a "stopping parameter") sent by the operating system, certain operations may occur including: first, it is determined if the hard drive power consumption management service is running. If so, then, the hard drive power consumption management service is turned off.

If the termination of the hard drive power consumption management service fails, warning information may be issued showing the failure of the termination of the hard drive power consumption management service.

It should be noted that in embodiments according to disclosure, hard drive power consumption management service installed in the operation system is used to control the hard drive for user's cold data storage to convert between a high power consumption state and a low power consumption state. There are other ways for the conversion of the hard drive between a high power consumption state and a low power consumption state, e.g., conversion of the hard drive may be controlled by using a function "IOCTL" that manages an I/O passageway of a device in a driver program.

Figure 3B:
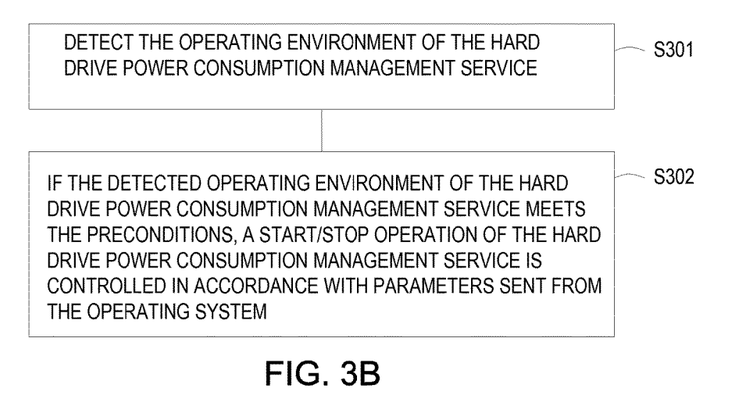
FIG. 3B is a flow diagram of a method of controlling a hard drive power consumption management service in accordance with an embodiment.

FIG. 3B is a flow chart of a method of controlling a hard drive power consumption management service according to an embodiment of the disclosure. In step S301, an operating environment of a hard drive power consumption management service is detected. Next in step S302, if the detected operating environment of the hard drive power consumption management service meets preconditions, a start/stop operation of the hard drive power consumption management service is controlled in accordance with parameters sent from the operating system.

Figure 4:
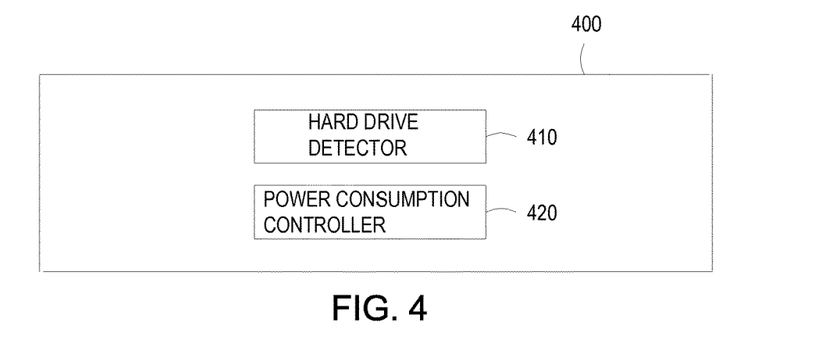
FIG. 4 is a block diagram of an apparatus for controlling power consumption of hard drive in accordance with an embodiment.

FIG. 4 shows a block diagram of a device for controlling hard drive power consumption according to an embodiment of the disclosure.

The device 400 includes a hard drive detector 410 configured for detecting a fault in a hard drive of a node hard drive group. The preset modes of the power consumption include at least one high power consumption state and at least one low power consumption state The device 400 also includes a power consumption controller 420 configured for converting a hard drive in the node hard drive group between preset modes of power consumption through a hard drive power consumption management service if there is no fault detected in any hard drive in the node hard drive group.

Figure 5:
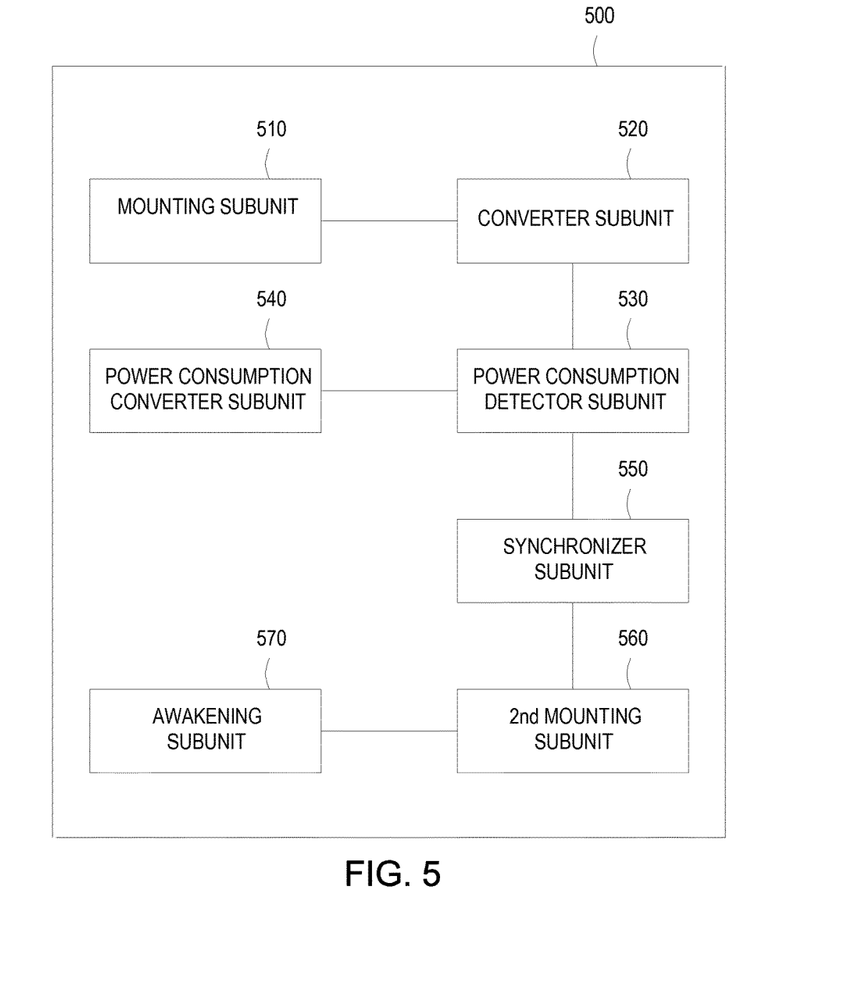
FIG. 5 is a block diagram of a service controlling module for controlling power consumption in accordance with an embodiment.

FIG. 5 illustrates a block diagram of a power consumption controller 500 according to an embodiment of the disclosure. The power consumption controller 500 includes a mounting subunit 510 which is configured to mount a hard drive in a node hard drive group in read-only mode when a command of converting a hard drive in a node hard drive group from a high power consumption state to a low power consumption state is received from a hard drive power consumption management service.

The power consumption controller 500 also includes a convertor subunit 520 which is configured to convert the hard drive in the node hard drive group from the high power consumption state to the low power consumption state.

In embodiments according to disclosure, the power consumption controller 500 may also include a power consumption detector subunit 530 which is configured to detect periodically according to a preset time interval if the hard drives in a node of the hard drive group are operating in a low power consumption state.

In embodiments according to disclosure, the power consumption controller 500 may also include a power consumption convertor subunit 540 which is configured to convert, if a hard drive in the node hard drive group is not operating in a low power consumption state, the hard drive to the low power consumption state.

In embodiments according to disclosure, the power consumption controller 500 may also include a synchronizer subunit 550 configured for synchronizing data in a cache of an operating system to a hard drive in a node hard drive group prior to converting the hard drive in the node hard drive group from a high power consumption state to a low power consumption state.

In embodiments according to disclosure, the power consumption controller 500 may also include a second mounting subunit 560 configured to mount a hard drive operation in a node hard drive group in read-and-write mode when a command is received from the management service for converting the hard drive from a low power consumption state to a high power consumption state.

In embodiments according to disclosure, the power consumption controller 500 may also include an awakening subunit 570 configured for awakening a hard drive in a node hard drive group by accessing the hard drive.

In an embodiment according to the disclosure, the awakening subunit 570 can create an empty hidden file under a mount directory of a hard drive of a node of a hard drive group. The awakening subunit 570 deletes the hidden file after the file is created successfully.

Figure 6:
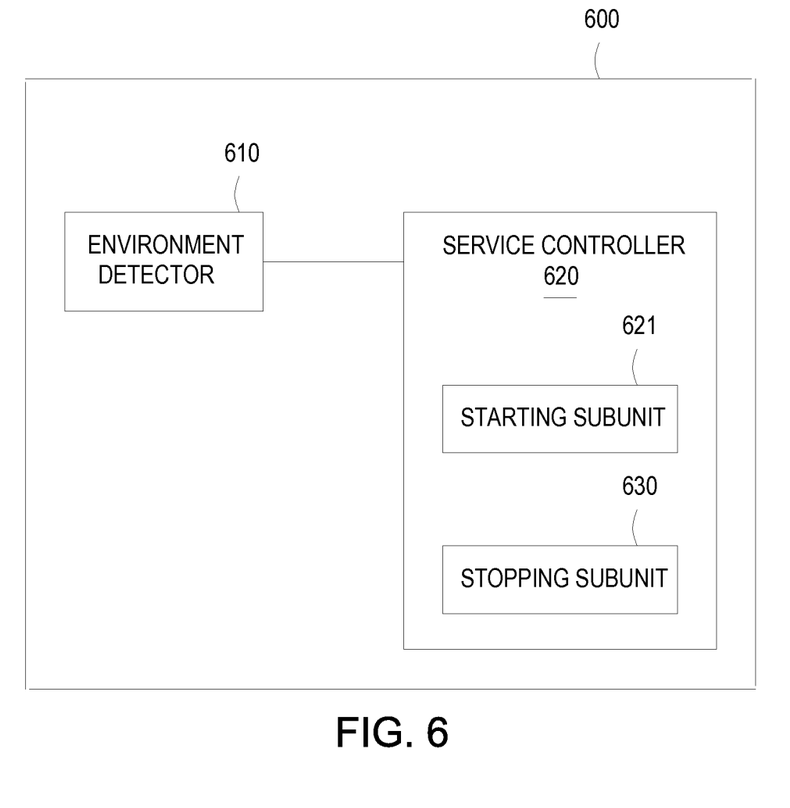
FIG. 6 is a block diagram of an apparatus for controlling a hard drive power consumption management service in accordance with an embodiment.

FIG. 6 illustrates a block diagram of a device 600 for controlling a hard drive power consumption management service according to an embodiment of the disclosure.

The device 600 includes an environment detector 610 configured for detecting an operating environment of a hard drive power consumption management service.

The device 600 also includes a service controller 620 configured for controlling a start/stop operation of the hard drive power consumption management service in accordance with parameters sent from an operating system, if the operating environment of hard drive power consumption the management service meets certain preconditions.

The preconditions may include: the existence of log files of the hard drive power consumption management service, existence of configuration files of the hard drive in a node hard drive group, and/or existence of files of analyzing service and files preprocessing associated with modes. Preconditions may also include that the configuration files of the hard drives in the node hard dive group are found not to be empty, and the files of analyzing service and files of preprocessing modes have execution permissions.

The service controller 620 may include a staring subunit 621 which is configured to activate the hard drive power consumption management service a first parameter is received from the operating system.

Additionally, the service controller 620 may include a stopping subunit 630 which is configured for shutting down the hard drive power consumption management service when a second parameter is received from the operating system.

It is appreciated that those skilled in the art can understand that steps or part of steps described in the descriptions may be implemented by using a program/software to command corresponding hardware. The program may be stored in a computer-readable medium including a ROM, a RAM, a hard drive, and/or a CD.

Although certain embodiments and methods have been disclosed herein, it will be apparent from the foregoing disclosure to those skilled in the art that variations and modifications of such embodiments and methods may be made without departing from the spirit and scope of the disclosure. It is intended that the disclosure be defined by the appended claims and the rules and principles of applicable law.

What is claimed is:

1. A method for controlling hard drive power consumption, comprising:
   determining whether a hard drive fault in a group of hard drives prevents a first hard drive in the group of hard drives from changing power states;
   if no fault prevents the first hard drive in the group of hard drives from changing power states, synchronizing data in a cache with data on the first hard drive;
   mounting the first hard drive in a read-only mode after data in the cache and data on the first hard drive have been synchronized; and
   reducing power consumed by the first hard drive after data in the cache and data on the first hard drive have been synchronized.

2. The method of claim 1, wherein the first hard drive is mounted in the read-only mode and power consumed by the first hard drive is reduced during a same time.

3. The method of claim 2, further comprising transmitting a reduce power command to the first hard drive and a second hard drive in parallel.

4. The method of claim 3, wherein the first and second hard drives transition from a high-power consumption state to a low-power consumption state in response to the reduce power command.

5. The method of claim 3, further comprising mounting the first hard drive in the group of hard drives in a read and write mode in order to convert the first hard drive from a low power consumption state to a high power consumption state.

6. The method of claim 5, further comprising awakening the first hard drive in the group of hard drives by accessing the first hard drive in the group of hard drives after the first hard drive has been mounted in the read and write mode.

7. A method for controlling hard drive power consumption, comprising:
   synchronizing data in a cache with data on a first hard drive;
   mounting the first hard drive in a read-only mode after data in the cache and data on the first hard drive have been synchronized;
   transmitting a reduce power command to the first hard drive and a second hard drive in parallel;
   reducing power consumed by the first hard drive after data in the cache and data on the first hard drive have been synchronized, the first hard drive being mounted in the read-only mode and power consumed by the first hard drive being reduced during a same time, the first and second hard drives transitioning from a high-power consumption state to a low-power consumption state in response to the reduce power command;
   detecting, after a preset time interval, if every hard drive in a group of hard drives is operating in a low power consumption state, the group of hard drives including the first and second hard drives; and
   if a hard drive in the group of hard drives is not operating in the low power consumption state, converting all hard drives from the group of hard drives that are not operating in the low power consumption state to the low power consumption state.

8. The method of claim 7, further comprising preventing a change in a power consumption state of the first hard drive of the group of hard drives when a fault exists in the first hard drive.

9. An apparatus for controlling hard drive power consumption, the apparatus comprising a central processing unit (CPU) to:
   receive a start command when a number of preconditions have been met, the number of preconditions including one or more of an existing log file of a hard drive power consumption, a non-empty configuration file of a hard drive, files of analyzing service, and files of preprocessing modes which hold execution permissions;

synchronize data in a cache with data on the hard drive after the start command has been received;

mount the hard drive in a read-only mode after data in the cache and data on the hard drive have been synchronized; and reduce power consumed by the hard drive after data in the cache and data on the hard drive have been synchronized.

10. A method for controlling hard drive power consumption, comprising:

synchronizing data in a cache with data on a hard drive;

mounting the hard drive in a read-only mode after data in the cache and data on the hard drive have been synchronized;

reducing power consumed by the hard drive after data in the cache and data on the hard drive have been synchronized;

detecting, a preset time interval after reducing power, if the hard drive is operating in a low power consumption state; and if the hard drive is not operating in the low power consumption state, converting the hard drive to the low power consumption state.

11. A non-transitory computer-readable storage medium having embedded therein program instructions that, when executed by a processor, cause the processor to execute a method for controlling hard drive power consumption, the method comprising:

determining whether a hard drive fault in a group of hard drives prevents a first hard drive in the group of hard drives from changing power states;

if no fault prevents the first hard drive in the group of hard drives from changing power states, synchronizing data in a cache with data on the first hard drive of a group of hard drives;

mounting the first hard drive in a read-only mode after data in the cache and data on the first hard drive have been synchronized, and reducing power consumed by the first hard drive after data in the cache and data on the first hard drive have been synchronized.

12. The medium of claim 11, wherein the first hard drive is mounted in a read-only mode and power consumed by the first hard drive is reduced during a same time.

13. The medium of claim 12, wherein the method further comprises transmitting a reduce power command to the first hard drive and a second hard drive in parallel.

14. The medium of claim 13, wherein the first and second hard drives transition from a high-power consumption state to a low-power consumption state in response to the reduce power command.

15. The medium of claim 13, wherein the method further comprises: mounting the first hard drive in the group of hard drives in a read and write mode in order to convert the first hard drive in the group of hard drives from a low power consumption state to a high power consumption state; and awakening the first hard drive in the group of hard drives by accessing the first hard drive in the group of hard drives after the first hard drive has been mounted in the read and write mode.

16. A non-transitory computer-readable storage medium having embedded therein program instructions that, when executed by a processor, cause the processor to execute a method for controlling hard drive power consumption, the method comprising:

synchronizing data in a cache with data on a first hard drive;

mounting the first hard drive in a read-only mode after data in the cache and data on the first hard drive have been synchronized;

transmitting a reduce power command to the first hard drive and a second hard drive in parallel;

reducing power consumed by the first hard drive after data in the cache and data on the first hard drive have been synchronized, the first hard drive being mounted in the read-only mode and power consumed by the first hard drive is reduced during a same time, the first and second hard drives transitioning from a high-power consumption state to a low-power consumption state in response to the reduce power command;

detecting, after a preset interval, if every hard drive in the group of hard drives is operating in a low power consumption state; and converting all hard drives in the group of hard drives that are not operating in the low power consumption state to the low power consumption state.

17. The medium of claim 16, further comprising preventing a change in a power consumption state of the first hard drive of the group of hard drives when a fault exists in the first hard drive.

18. A non-transitory computer-readable storage medium having embedded therein program instructions that, when executed by a processor, cause the processor to execute a method for controlling hard drive power consumption, the method comprising:

synchronizing data in a cache with data on a hard drive;

mounting the hard drive in a read-only mode after data in the cache and data on the hard drive have been synchronized;

reducing power consumed by the hard drive after data in the cache and data on the hard drive have been synchronized;

detecting, a preset time interval after reducing power, if the hard drive is operating in a low power consumption state; and if the hard drive is not operating in the low power consumption state, converting the hard drive to the low power consumption state.

19. A non-transitory computer-readable storage medium having embedded therein program instructions that, when executed by a processor, cause the processor to execute a method for controlling hard drive power consumption, the method comprising:

receiving a start command when a number of preconditions have been met, the number of preconditions including one or more of an existing log file of a hard drive power consumption, a non-empty configuration file of a hard drive, files of analyzing service, and files of preprocessing modes which hold execution permissions;

synchronizing data in a cache with data on the hard drive after the start command has been received;

mounting the hard drive in a read-only mode after data in the cache and data on the hard drive have been synchronized; and reducing power consumed by the hard drive after data in the cache and data on the hard drive have been synchronized.

20. An apparatus for controlling hard drive power consumption, the apparatus comprising a central processing unit (CPU) to:
- determine whether a hard drive fault in a group of hard drives prevents a first hard drive in the group of hard drives from changing power states,
- if no fault prevents the first hard drive in the group of hard drives from changing power states, synchronize data in a cache with data on the first hard drive,
- mount the first hard drive in a read-only mode after data in the cache and data on the first hard drive have been synchronized, and
- reduce power consumed by the first hard drive after data in the cache and data on the first hard drive have been synchronized.

21. A method for controlling hard drive power consumption, comprising:
- receiving a start command when a number of preconditions have been met, the number of preconditions including one or more of an existing log file of a first hard drive power consumption, a non-empty configuration file of a first hard drive in a group of hard drives, and files of analyzing service and files of preprocessing modes which hold execution permissions;
- synchronizing data in a cache with data on the first hard drive after the start command has been received;
- mounting the first hard drive in a read-only mode after data in the cache and data on the first hard drive have been synchronized; and
- reducing power consumed by the first hard drive after data in the cache and data on the first hard drive have been synchronized.

22. A method for controlling hard drive power consumption, comprising:
- receiving a start command when a number of preconditions have been met, the start command enabling changes to be made to hard drive power consumption within a group of hard drives;
- synchronizing data in a cache with data on a hard drive in the group of hard drives after the start command has been received;
- mounting the hard drive in a read-only mode after data in the cache and data on the hard drive have been synchronized;
- reducing power consumed by the hard drive after data in the cache and data on the hard drive have been synchronized; and
- receiving a stop command, the stop command disabling changes to hard drive power consumption within the group of hard drives.

23. An apparatus for controlling hard drive power consumption, the apparatus comprising a central processing unit (CPU) to synchronize data in a cache with data on a hard drive, mount the hard drive in a read-only mode after data in the cache and data on the hard drive have been synchronized, reduce power consumed by the hard drive after data in the cache and data on the hard drive have been synchronized, detect, a preset interval after reducing power, if the hard drive is operating in a low power consumption state, and if the hard drive is not operating in the low power consumption state, convert the hard drive to the low power consumption state.

24. A non-transitory computer-readable storage medium having embedded therein program instructions that, when executed by a processor, cause the processor to execute a method for controlling hard drive power consumption, the method comprising:
- receiving a start command when a number of preconditions have been met, the start command enabling changes to be made to hard drive power consumption within a group of hard drives;
- synchronizing data in a cache with data on a hard drive of the group of hard drives;
- mounting the hard drive in a read-only mode after data in the cache and data on the hard drive have been synchronized;
- reducing power consumed by the hard drive after data in the cache and data on the hard drive have been synchronized; and
- receiving a stop command, the stop command disabling changes to hard drive power consumption within the group of hard drives.

25. An apparatus for controlling hard drive power consumption, the apparatus comprising a central processing unit (CPU) to:
- receive a start command when a number of preconditions have been met, the start command enabling changes to be made to hard drive power consumption within a group of hard drives;
- synchronize data in a cache with data on a hard drive of the group of hard drives;
- mount the hard drive in a read-only mode after data in the cache and data on the hard drive have been synchronized;
- reduce power consumed by the hard drive after data in the cache and data on the hard drive have been synchronized; and
- receive a stop command, the stop command disabling changes to hard drive power consumption within the group of hard drives.

* * * * *